UNITED STATES PATENT OFFICE.

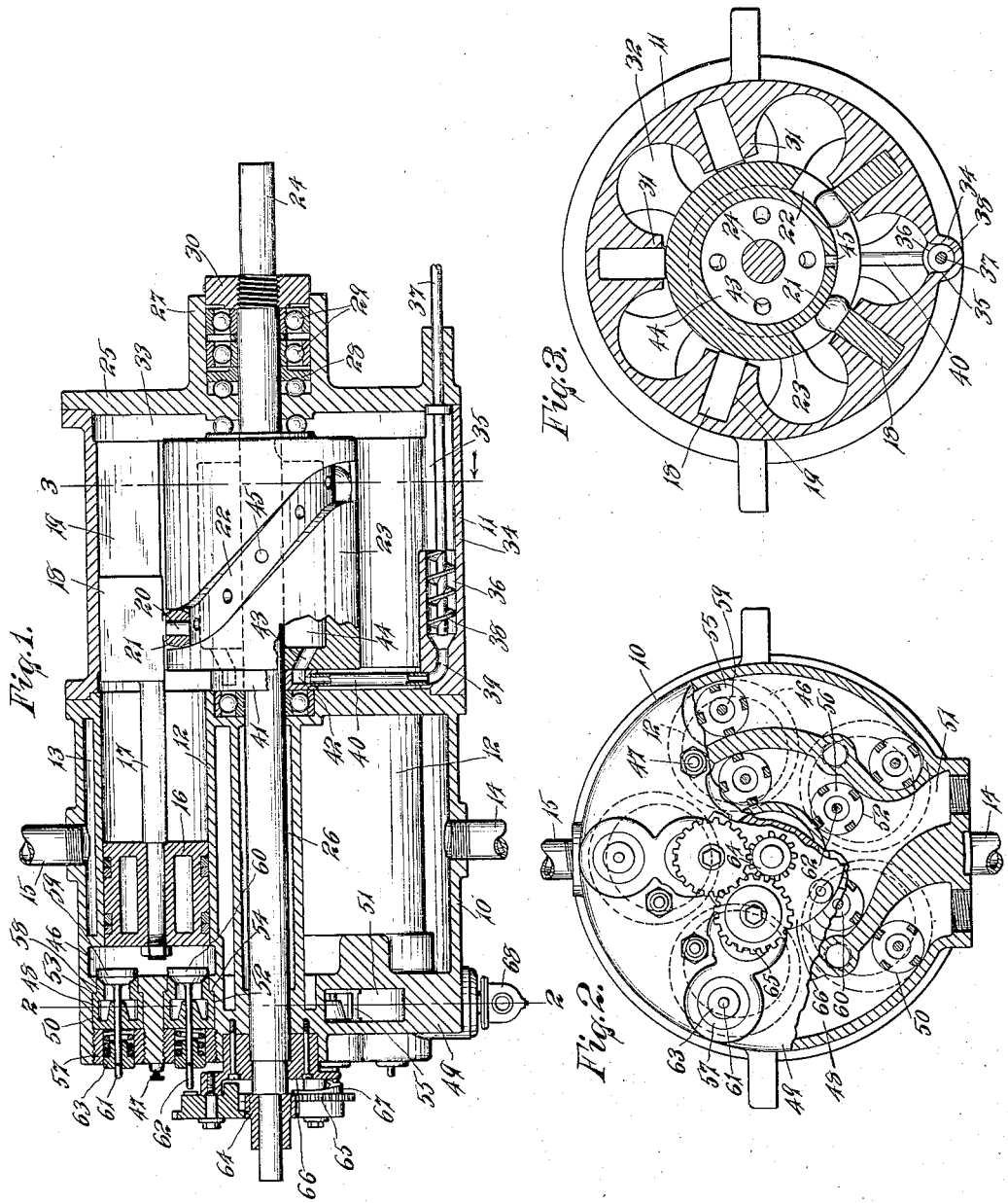

WILBUR L. SHEPARD, OF WEST HARTFORD, CONNECTICUT.

INTERNAL-COMBUSTION ENGINE.

1,239,310.     Specification of Letters Patent.     Patented Sept. 4, 1917.

Application filed February 17, 1916. Serial No. 78,933.

*To all whom it may concern:*

Be it known that I, WILBUR L. SHEPARD, a citizen of the United States, and a resident of West Hartford, in the county of Hartford and State of Connecticut, have invented a new and Improved Internal-Combustion Engine, of which the following is a specification.

My invention relates to that class of engines in which a combustible fluid is introduced into the cylinder where it is ignited, the force generated by the explosion driving the piston to the opposite end of the cylinder, and an object of my invention, among others, is to produce an engine of this type that shall be particularly efficient as to the amount of fuel consumed and the effect produced thereby.

One form of device embodying my invention and in the construction and use of which the objects herein set out, as well as others, may be attained, is illustrated in the accompanying drawings, in which—

Figure 1 is a view in central longitudinal section through the casing of an engine embodying my invention with the parts on the interior broken away to show construction.

Fig. 2 is an end view partially broken away on plane denoted by dotted line 2—2 of Fig. 1.

Fig. 3 is a view in cross section on plane denoted by dotted line 3—3 of Fig. 1.

The construction shown herein embodies a casing that is preferably round in cross section and of a length to contain the cylinders and power transmitting devices, as shown herein, this casing being composed of two sections 10—11. The section 10 is bored or otherwise formed to comprise cylinders 12 that are concentrically arranged in any desired number, the spaces between and around the cylinders constituting a cooling chamber 13 into which water or other cooling fluid may be introduced by any ordinary means through an inlet 14 and from which it may flow through the outlet 15. Pistons 16 of any ordinary construction are located in each of the cylinders, piston rods 17 extending therefrom and having secured thereto guide heads 18 located and traveling in guide grooves 19 in the section 11 of the casing.

Each guide head has a stud 20 bearing a roller 21, these rollers extending into a cam groove 22 in a driving cam 23 secured to an engine shaft 24 that extends through the casing, and has its bearing in a head 25 at one end of the casing and also at the ends of an opening 26 through the center of the section 10. The head 25 has a neck 27 through which the shaft extends and a thrust bearing 28 and radial bearings 29 are located within this neck, said bearings comprising anti-friction members, as balls, arranged in any suitable manner, and said parts being held in place as by a collar 30 secured to the shaft. The end of the driving cam is formed to receive anti-friction members which travel against the inner surface of the head 25, these constituting thrust bearings oppositely arranged to those within the recess in the neck 27.

The section 11 is provided with webs 31 in which the guide grooves 19 are formed, the webs being formed and arranged to create oil chambers 32 extending lengthwise of the section. The webs are preferably somewhat shorter than the section, creating an oil space 33 at the end of the section, the head 25 forming one wall of this space. A rib 34 extending along one side of the section 11 contains an oil groove 35 opening into one of the oil chambers 32, and also into the oil space 33. This oil groove terminates in an oil well 36 formed in the wall at one end of the section 11 and at one end of the rib 34. A shaft 37 for a pump comprising a screw 38 extends along the groove 35 and through the head 25, this shaft being driven as by a suitable driving connection (not shown) with the engine shaft 24. An oil passage 39 extends from the well 36 to a pipe or conduit 40 secured at one end in the wall of said chamber 32 in which the oil groove 35 is located, the other end of the pipe being secured to an oil distributing collar 41 loosely mounted on the shaft 24 and having an oil distributing groove 42 communicating with the hole in which the end of the pipe 40 is secured. This oil distributing groove is closed by the end of the driving cam 23, the latter having a series of oil distributing holes 43 opening through its end wall into an oil distributing chamber 44 in the interior of the cam 23. This chamber is inclosed except for the holes 43 and oil distributing ports 45 extending through the walls of the chamber 44 at suitable intervals and opening into the cam groove 22. The oil distributing holes 43 extend in a diagonal direction with respect to the axis of the shaft 24 so that flow of oil through said holes will be aided by centrifugal action. In the operation of this part of the engine, oil being supplied in a proper amount within the section 11, the rotation of the screw 38 will force the oil through the passage 39, and pipe 40 into the groove in the distributing collar 41, from which it will pass into the distributing holes 43 and from thence, by the aid of centrifugal force into the distributing chamber 44 from which it will flow by centrifugal action through the holes 45 into the groove 22 and against the guide heads 18. The oil will also be thrown into the chambers 32 from which it will be forced by the guides into the cylinders 12.

Any number of cylinders may be employed as circumstances may require, the end of each cylinder having an explosion chamber 46 within which the ignition devices 47, of any suitable construction (as spark plugs) may extend. An inlet passage 48 extends within the end 49 of the section 10 of the casing, valve cage openings 50 extending from the passage 48 into the explosion chambers 46 of the cylinders. An exhaust passage 51 also extends within the end 49 and valve cage openings 52 connect the combustion chamber of each cylinder with said exhaust passage. Each of the openings 50 and 52 is formed with a shoulder 53 or 54 against which inlet valve cages 55 and exhaust valve cages 56 are seated and held by screw rings 57. Each cage is provided with a shoulder that rests against a shoulder 53 or 54, and each of said cages has an extension 58 on which a valve seat for an inlet valve 59 or an exhaust valve 60 is formed. The stems 61 and 62 of these valves extend through the cages and through caps 63 that are secured to the stems as by means of pins, valve springs being located in the spring chambers in the rings 57 and between the valve cages and said caps, pressing against the latter and forcing the valves to their seats.

A driving pinion 64 is secured to the shaft 24, and each of a series of operating pinions 65 is mounted on a stud projecting from a pinion supporting plate 66 secured to the end of the casing, as shown herein this plate having a hub extending into a recess in the end of the casing. The width of the pinion 64 is somewhat greater than that of the valve operating pinions 65, and enough so as to enable the latter pinions to be formed and mounted to overlap one another thereby economizing space. Valve operating cams 67 are located underneath the pinions 65 by which the cams are driven, in the construction herein shown said pinions and cams being formed integral one with another.

The operation of the engine will be readily understood from the foregoing description, the inlet valves 59 being opened by the vacuum created by the movement of the pistons within the cylinders, the explosive mixture being introduced to the passage 48 as through a carbureter 68 and the explosive charges being drawn into the explosion chambers 46 in which they are fired in any suitable manner, as will be readily understood. The cams 67 open the exhaust valves 60 at the proper time to permit the exhaust of the gases of explosion, in the construction herein shown the pinions 64 and 65 being of such relative size and the cams being so shaped that the exhaust valves will be opened at every other complete stroke of the pistons, a complete stroke being a movement from one end of the cylinder to the opposite end and back. Timing devices of any suitable and well known construction may be employed to ignite the charge in each cylinder, it being understood that in the construction herein shown a charge will be fired at every other complete stroke of each of the pistons.

While I have shown and described herein a satisfactory construction embodying my invention, this may be departed from to a greater or lesser degree and yet be within the spirit and intent of the invention as set forth in the appended claims.

I claim:

1. A casing having a cam chamber, a cam rotatably mounted in said chamber and having a cam groove, and a reciprocating member having a part projecting into said groove, said cam having a lubricant distributing chamber with ports opening into said groove.

2. A casing having a cam chamber, a cam rotatably mounted in said chamber and having a cam groove, a reciprocating member having a part projecting into said groove, said cam having a lubricant distributing chamber with ports into said groove, an oil chamber, and means for conveying the oil from said oil chamber to said distributing chamber.

3. A casing having a cam chamber, a cam rotatably mounted in said chamber and having a cam groove, a driving member having a part projecting into said groove, said cam having a lubricant distributing chamber with ports into said groove, an oil chamber, and a pump for pumping oil from the oil chamber into said distributing chamber.

4. A casing having a cam chamber, a cam rotatably mounted in said chamber and having a cam groove, a lubricant distributing chamber with ports opening between said distributing chamber and cam groove, an oil chamber, a screw pump located in said oil chamber for pumping oil into said distributing chamber, and a driving member having a part projecting into said cam groove.

5. A casing having a cam chamber therein, a cam located in said chamber and having a distributing chamber, a cam groove and ports opening between said groove and distributing chamber, a collar having a groove registering with ports leading into said distributing chamber, an oil chamber in said casing, a pump located in said oil chamber, a connection between said oil chamber and groove in said collar, and a driving member having a part projecting into said cam groove.

WILBUR L. SHEPARD.